United States Patent
Kempf et al.

(10) Patent No.: US 11,504,561 B2
(45) Date of Patent: Nov. 22, 2022

(54) FIRE EXTINGUISHING SYSTEM VALVE, IN PARTICULAR WET ALARM VALVE, DRY ALARM VALVE OR SPRAY WATER VALVE AND CONTROL MODULE FOR THE SAME AND FIRE EXTINGUISHING SYSTEM UTILIZING THE SAME

(71) Applicant: Minimax GmbH, Bad Oldesloe (DE)

(72) Inventors: Peter Kempf, Bad Oldesloe (DE); Frank Stachowitz, Ratzeburg (DE); Eduard Engelsman, Lübeck (DE)

(73) Assignee: Minimax GmbH, Bad Oldesloe (DE)

( * ) Notice: Subject to any disclaimer, the term of this patent is extended or adjusted under 35 U.S.C. 154(b) by 16 days.

(21) Appl. No.: 16/635,158

(22) PCT Filed: Aug. 1, 2018

(86) PCT No.: PCT/EP2018/070884
§ 371 (c)(1),
(2) Date: Jan. 29, 2020

(87) PCT Pub. No.: WO2019/025495
PCT Pub. Date: Feb. 7, 2019

(65) Prior Publication Data
US 2021/0086008 A1    Mar. 25, 2021

(30) Foreign Application Priority Data
Aug. 1, 2017    (DE) .................... 10 2017 117 417.6

(51) Int. Cl.
*A62C 35/68*    (2006.01)
*A62C 37/50*    (2006.01)
(Continued)

(52) U.S. Cl.
CPC .............. *A62C 35/68* (2013.01); *A62C 37/50* (2013.01); *A62C 31/02* (2013.01); *A62C 35/62* (2013.01); *F16K 37/0066* (2013.01)

(58) Field of Classification Search
CPC ......... A62C 35/68; A62C 37/50; A62C 31/02; A62C 35/62; F16K 37/0066; F16K 5/0605; F16K 27/067; F16K 37/005
See application file for complete search history.

(56) References Cited

U.S. PATENT DOCUMENTS

| 1,553,884 A | 3/1922 | Tyden |
| 2,003,884 A | 2/1933 | Halford |

(Continued)

FOREIGN PATENT DOCUMENTS

| CN | 203309202 U | 11/2013 |
| CN | 205118301 U | 3/2016 |

(Continued)

OTHER PUBLICATIONS

International Search Report, International Application No. PCT/EP2018/070884 (published under WO 2019/025495), 5 pages (dated Dec. 19, 2018).

*Primary Examiner* — Qingzhang Zhou
(74) *Attorney, Agent, or Firm* — Perkins Coie LLP

(57) ABSTRACT

A fire extinguishing system valve (1), in particular wet alarm valve, dry alarm valve or spray water valve, having a housing (3) which has a fluid inlet chamber (9), a fluid outlet chamber (11) and a closing body (13) which can move back and forth between a blocking state and a release state, wherein the fluid inlet chamber (9) and the fluid outlet chamber (11) communicate directly with one another in a fluid-conducting manner in the release state, and the closing body (13) prevents the direct communication between the fluid inlet chamber (9) and the fluid outlet chamber (11) in the blocking state. The housing (3) has a dedicated discharge (Continued)

duct (30) which has at least one inlet (30a, b) connected to the fluid outlet chamber (11) and an outlet (30c) leading out of the housing (3) of the fire extinguishing system valve (1), and which is integrated into the housing (3).

12 Claims, 5 Drawing Sheets

(51) Int. Cl.
   *A62C 31/02* (2006.01)
   *A62C 35/62* (2006.01)
   *F16K 37/00* (2006.01)

(56) References Cited

U.S. PATENT DOCUMENTS

| | | |
|---|---|---|
| 4,993,453 A | 2/1991 | McHugh |
| 6,810,910 B2 * | 11/2004 | McHugh ................ A62C 37/50 239/DIG. 15 |
| 7,249,611 B2 * | 7/2007 | Scaramucci .......... F16K 15/033 137/527.2 |
| 9,079,053 B2 | 7/2015 | Karihara et al. |
| 10,441,833 B2 | 10/2019 | Pohl et al. |
| D890,301 S | 7/2020 | Kempf et al. |
| 10,765,899 B2 | 9/2020 | Pohl et al. |
| 10,773,113 B2 | 9/2020 | Pohl |
| 2011/0048745 A1 | 3/2011 | Karihara |
| 2014/0374125 A1 * | 12/2014 | Johnson .............. F16K 27/0227 169/16 |
| 2018/0043197 A1 * | 2/2018 | Ringer .................. A62C 35/68 |
| 2019/0388718 A1 | 12/2019 | Pohl et al. |
| 2020/0222737 A1 | 7/2020 | Kempf |
| 2020/0346058 A1 | 11/2020 | Kempf et al. |

FOREIGN PATENT DOCUMENTS

| | | |
|---|---|---|
| DE | 324 354 | 8/1920 |
| DE | 12 39 571 B | 4/1967 |
| DE | 10 2007 049588 A1 | 4/2009 |
| JP | 2011-33160 | 2/2011 |
| WO | WO 99/59679 A1 | 11/1999 |

* cited by examiner

FIRE EXTINGUISHING SYSTEM VALVE, IN PARTICULAR WET ALARM VALVE, DRY ALARM VALVE OR SPRAY WATER VALVE AND CONTROL MODULE FOR THE SAME AND FIRE EXTINGUISHING SYSTEM UTILIZING THE SAME

PRIORITY CLAIM AND INCORPORATION BY REFERENCE

This application is a 35 U.S.C. § 371 application of International Application No. PCT/EP2018/070884, filed Aug. 1, 2018, which claims the benefit of German Application No. 10 2017 117 417.6 filed Aug. 1, 2017, each of which is incorporated by reference in its entirety.

TECHNICAL FIELD

The present invention relates to a fire extinguishing system valve, in particular a wet alarm valve, dry alarm valve or spray water valve, comprising a housing which has a fluid inlet chamber, a fluid outlet chamber and a closing body which move back and forth between a blocking state and a release state, wherein the fluid inlet chamber and the fluid outlet chamber communicate directly with one another in a fluid-conducting manner in the release state, and the closing body prevents the direct communication between the fluid inlet chamber and the fluid outlet chamber in the blocking state.

BACKGROUND AND SUMMARY OF THE INVENTION

Fire extinguishing system valves of the above-described type are generally known. What is to be understood by fire extinguishing system valves within the context of the present invention is the category including both passive and active alarm valves for use in fire extinguishing systems, specifically fire extinguishing systems having water-based extinguishing agents (for example water, water with additives, and the like). The most prominent representatives of these valve types are wet and dry alarm valves and spray water valves. What is to be understood by a passive alarm valve is a valve which opens automatically when predetermined pressure differences between the inlet side and outlet side are exceeded. An alarm is triggered even as a rule by the valve in response to the detection of the opening state, for example by means of a pressure switch which is arranged in an external alarm line and via which an alarm means, such as, for instance, an electrically operated alarm horn is then controlled, and/or directly by steering the extinguishing agent flow toward a hydraulically operated alarm means, such as, for instance, a water-operated alarm bell, fluidically connected to the alarm valve. Instead of or in addition to hydraulically operated alarm bells, optical indicators are also sometimes arranged in the region of the alarm valves in order, when there are a plurality of alarm valves arranged in parallel, to be able to better distinguish which of the alarm valves has been opened.

What is to be understood by an active alarm valve is a valve which, after an input of a corresponding signal from external fire detection means, or as a function of external control interventions, actively releases a fluid flow from the fluid inlet chamber into the fluid outlet chamber by means of opening the closing body and triggers an alarm. What is common to the two aforementioned valve types is that the alarm valves are often installed over long time periods in fire extinguishing systems without having to be used and it must be ensured that these valves function reliably in an emergency.

In the blocking state, fire extinguishing system valves are typically connected on the inlet side to a water supply which has a substantially constant supply pressure, provided for example by a pump system. However, pressure fluctuations can sometimes occur in the water supply, in particular if the fire extinguishing system is directly connected to the drinking water network. Fire extinguishing system valves, in particular wet alarm valves, are typically connected on the outlet side to a pipe network in which sprinklers or nozzles are provided. On the outlet side, too, pressure fluctuations arise as a result of temperature fluctuations, for example.

Given the long idle times of the fire extinguishing systems, there is a need, at certain time intervals, to check the operability of the alarm means and/or the operability of the fire extinguishing system valve itself. What has happened in the prior art in the past for this purpose is to provide, inter alia, external piping at the valve station in order that extinguishing agent can be discharged, from the outlet side of the extinguishing system valve, past the closing body so as to simulate an extinguishing operation. The pressure drop, associated with the discharge of the extinguishing agent, in the line on the outlet side as viewed from the fire extinguishing system valve thus allowed opening of the valve to be brought about and an alarm test to be performed.

The structural complexity required for realizing these functions and the time period required for mounting the necessary apparatus are generally perceived as disadvantageous. Against this background, the object on which the invention is based was to develop a fire extinguishing system valve of the type described at the outset to the effect that a time- and cost-efficient mounting is made possible in an optimal manner while realizing the above-described functions.

The invention achieves the object on which it is based in a first aspect such that the housing has a dedicated discharge duct which has at least one inlet connected to the fluid outlet chamber and an outlet leading out of the housing of the fire extinguishing system valve, and which is integrated into the housing, and in that the fire extinguishing system valve is designed to selectively release the dedicated discharge duct in a discharge position in the direction of its outlet or, in a blocking position, to close it fluid-tight in the direction of its outlet, and, in an alarm testing position, to remove extinguishing fluid from the fluid outlet chamber via a duct portion having a cross section which is smaller than the smallest cross section of the dedicated discharge duct.

The invention is based on the finding that an integration of the dedicated discharge duct connected to the fluid outlet side into the housing of the fire extinguishing system valve, despite a perceived increase in the component complexity of the housing, is surprisingly contrasted by a considerable simplification of the entire structural and apparatus requirement for realizing a direct discharge function or alarm testing function from the pipeline connected to the fire extinguishing system valve on the outlet side.

The invention is advantageously developed in that the housing has a housing basic body in which the fluid inlet chamber and the fluid outlet chamber are formed and the closing body is arranged, and further has a control module which is reversibly releasably connected to the housing basic body, wherein the dedicated discharge duct is formed in the control module.

A shut-off member is preferably arranged in the dedicated discharge duct and can be selectively switched into the blocking position or into the discharge position.

Depending on the dimensioning of the discharge duct, it is possible, when switching the shut-off member in the discharge duct into its release position, for water to be discharged quickly from the outlet-side pipeline of the fire extinguishing system with the fire extinguishing system valve installed.

In a preferred development of the invention, the fire extinguishing system valve has, in addition to the dedicated discharge duct, a further discharge duct which is connected in a fluid-conducting manner to the fluid outlet chamber, is integrated into the housing and leads out of the housing, wherein one of the discharge ducts is designed as an alarm testing duct and has a cross section which is smaller at least in certain portions than the smallest cross section of the other discharge duct. This second discharge duct is also preferably formed in the control module. The second discharge duct, or alarm testing duct, can preferably also be selectively blocked or released by means of a shut-off member.

In a preferred alternative embodiment of the invention which manages with only one dedicated discharge duct, the shut-off member can preferably additionally be switched into the alarm testing position in which the discharge duct is released in the direction of its outlet with the cross section reduced relative to the discharge position.

Preferably here, as viewed from the shut-off member, the discharge duct is provided, on the inlet side, with a first and a second branch duct which are each connected in a fluid-conducting manner to the fluid outlet chamber, wherein at least the first branch duct and the outlet of the discharge duct communicate with one another in a fluid-conducting manner in the discharge position of the shut-off member, exclusively the second branch duct communicates in a fluid-conducting manner with the outlet of the discharge duct in the alarm testing position of the shut-off member, and neither the first nor the second branch duct communicates with the outlet of the discharge duct in the blocking position of the shut-off member. The advantage of a single discharge duct having an inlet-side first and second branch duct lies in the further reduction in the required installation space.

There is preferably arranged in the second branch duct an additional blocking member by means of which an alarm test can be initiated in the alarm testing position. The shut-off member in the discharge duct preferably has a ball-shaped valve body which has a first passage which extends completely through the valve body and a second passage which is oriented at an angle to the first passage, and preferably opens into the first passage.

In one embodiment with only one discharge duct, the cross-sectional reduction is preferably formed in the discharge duct and/or in the shut-off member.

The cross-sectional reduction, either in the second discharge duct or in the above-described reduced cross-sectional region of the discharge duct or shut-off member, is preferably dimensioned in such a way that the flow resistance produced by the cross-sectional reduction at least approximates to that of a typical sprinkler or spray water valve, in other words a sprinkler or spray water valve assigned to the fire extinguishing system valve in the installed state. What is to be understood by the assignment is a downstream arrangement in the fire extinguishing system that is in communication with the fire extinguishing system valve in a fluid-conducting manner. What is to be understood by the approximation is that the flow resistance which is achieved by the cross-sectional reduction deviates by less than 50% from the flow resistance of a typical or assigned sprinkler or spray water valve. The flow resistances of sprinklers and spray water valves are typically standardized. In the case of sprinklers, the flow resistance is expressed by the so-called K-factor, which represents a nozzle constant at a certain volumetric flow of the sprinkler or of the nozzle and is calculated by means of the formula $$K=Q/\sqrt{p}$$

with
K as the nozzle constant,
Q as the volumetric flow (l/min), and
p as pressure at the nozzle/sprinkler (in bar).

A volumetric flow of 171 liters per minute under an operating pressure of 9 bar would result, for example, in a K-factor of K=57. The K-factors of the sprinklers are generally assigned in design sizes of the sprinklers, classified by the sprinkler connection thread; thus, for example, the above-specified K-factor of K=57 would be assigned to a sprinkler connection thread of ⅜" DN10.

In the case of a typical sprinkler, the K-factor is preferably in a region of K=85 or less, particularly preferably K=57 or less. Accordingly, the cross-sectional reduction in preferred embodiments preferably has a K-factor of 85 or less, particularly preferably of 57 or less.

In a further preferred embodiment, a bypass duct is formed in the housing, in particular in the control module, and connects the fluid inlet chamber and the fluid outlet chamber to one another in a fluid-conducting manner, wherein a shut-off member for selectively blocking or releasing the bypass duct is preferably provided in the bypass duct. The bypass duct integrated into the housing makes it possible for extinguishing agent to be transported from the fluid inlet side to the fluid outlet side without opening the closing body in the housing of the fire extinguishing system valve in order, for instance, to compensate for pressure fluctuations which result on account of temperature changes.

In a further preferred embodiment, a direct alarm duct is provided in the housing, in particular in the control module, and, on the inlet side, is connected directly in a fluid-conducting manner to the fluid inlet chamber and has an outlet which leads out of the housing, in particular control module, and which is designed for connection to an external alarm line, in particular an alarm bell line, wherein a shut-off member is preferably arranged in the direct alarm duct and can be selectively switched into a blocking position or a release position. In the blocking position of the shut-off member at the direct alarm duct, the direct alarm duct is closed. In the release position, the fluid inlet chamber is connected in a fluid-conducting manner to the direct alarm duct outlet.

The direct alarm duct makes it possible, without external apparatus on the fire extinguishing system valve or the valve station, to carry out a direct alarm, by which is to be understood, as already explained at the outset, a triggering of the alarm means without prior opening of the closing body of the fire extinguishing system valve.

In a further preferred embodiment, an alarm duct is arranged in the housing, preferably in the housing basic body and/or the control module, wherein the alarm duct is arranged and formed in such a way that it is also blocked in the blocking state of the closing body, namely particularly preferably by the closing body itself, and is flooded with the closing body opened, wherein the alarm duct extends through the housing, in particular through the control module, and has an outlet which leads out of the housing, in particular control module, and which is designed for connection to an external alarm line, in particular an alarm bell line.

The invention has been described above on the basis of a first aspect with reference to the fire extinguishing system valve itself.

However, the invention relates in a further aspect also to a control module for a fire extinguishing system valve, in particular wet alarm valve, dry alarm valve or spray water valve.

The invention achieves the object specified at the outset on which it is based in that the control module is provided for a housing basic body of the housing of the fire extinguishing system valve according to one of the above-described preferred embodiments. The control module has fastening means for reversibly releasable connection to corresponding fastening means of a housing basic body of the fire extinguishing system valve, and a dedicated discharge duct which has at least one inlet and one outlet, and is integrated into the control module, wherein the at least one inlet and the outlet are arranged in such a way that, with the housing basic body connected to the control module, the at least one inlet is connected to a fluid outlet chamber of the fire extinguishing system valve, and is designed to selectively release the dedicated discharge duct in a discharge position in the direction of its outlet or, in a blocking position, to close it fluid-tight in the direction of its outlet, and, in an alarm testing position, to remove extinguishing fluid from the fluid outlet chamber via a duct portion having a cross section which is smaller than the smallest cross section of the dedicated discharge duct.

The control module according to the invention utilizes the advantages and preferred embodiments of the fire extinguishing system valve according to the invention. The preferred embodiments and developments of the fire extinguishing system valve are therefore simultaneously preferred embodiments and developments of the control module, and therefore reference is made in this respect to the above statements.

In a further aspect, the invention relates to a fire extinguishing system, in particular to sprinkler systems, comprising one or more fluid lines in which a fire extinguishing system valve for blocking or releasing the fluid line is arranged. The invention achieves the object on which it is based in such a fire extinguishing system in that it has a fire extinguishing system valve according to one of the above-described preferred embodiments.

Just like the control module, the fire extinguishing system according to the invention utilizes the advantages and preferred embodiments and developments of the fire extinguishing system valve according to the invention, with the result that preferred embodiments and developments of the fire extinguishing system valve are simultaneously preferred embodiments and developments of the fire extinguishing system. Reference is made again in this respect to the above statements.

BRIEF DESCRIPTION OF THE DRAWINGS

The invention will be described in more detail below with reference to the appended figures on the basis of a preferred exemplary embodiment.

MODE(S) FOR CARRYING OUT THE INVENTION

Figure 1:
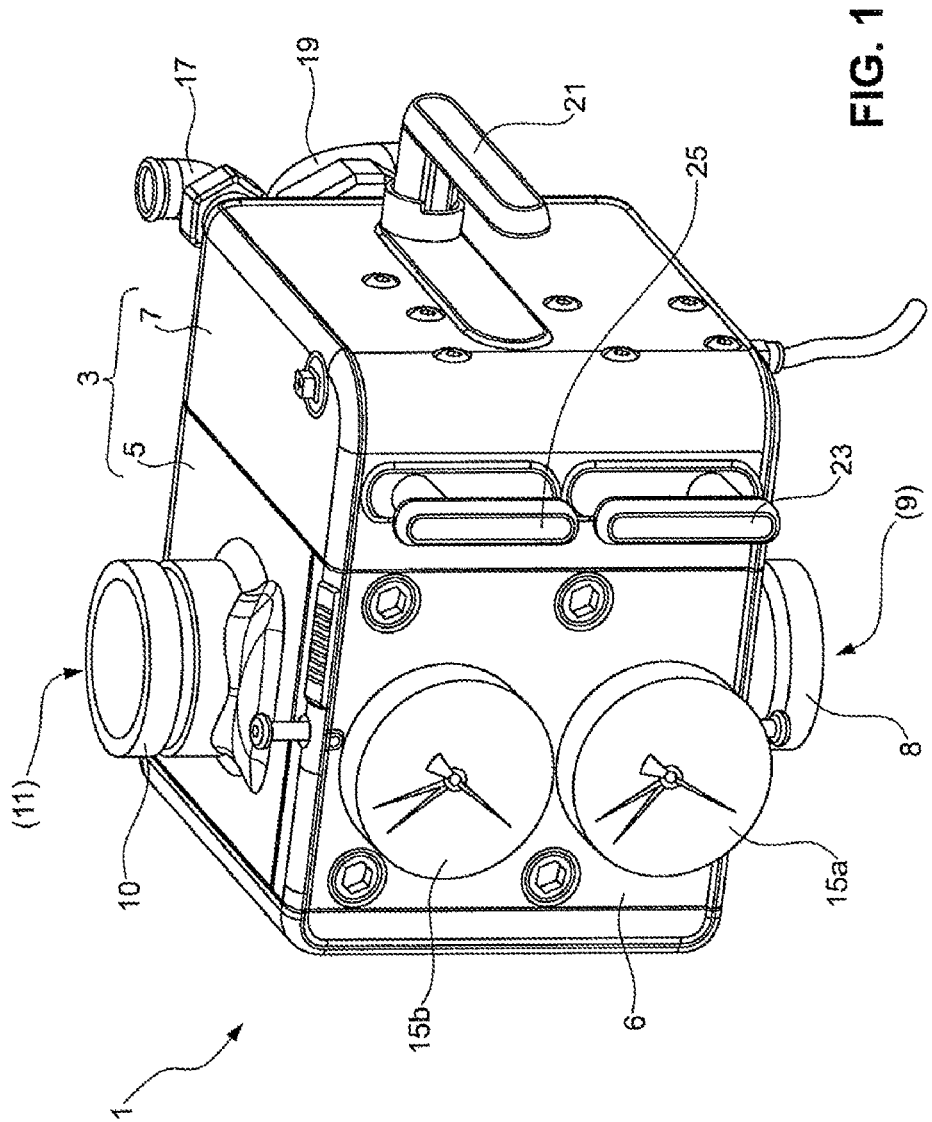
FIG. 1 shows a fire extinguishing system valve in a preferred embodiment in a schematic three-dimensional view.

FIG. 1 shows a fire extinguishing system valve 1. The fire extinguishing system valve 1 has a housing 3. The housing 3 comprises a housing basic body 5 and a control module 7 which is reversibly releasably connected to the housing basic body 5, preferably by means of screw connections.

A front panel 6 is mounted on the housing basic body 5.

The housing 3 has, on the housing basic body 5, an inlet-side connection piece 8 and an outlet-side connection piece 10. The inlet-side connection piece 8 leads into a fluid inlet chamber 9 (not shown). The outlet-side connection piece 10 leads into a fluid outlet chamber 11 (cf. FIG. 2).

A first and a second manometer 15a, b are arranged on the front panel 6, wherein the first manometer 15a indicates the pressure in the fluid inlet chamber 9, and the second manometer 15b indicates the pressure in the fluid outlet chamber 11.

On the control module 7 there is arranged a first connection piece 17 which is designed for connection to an alarm line. A second connection piece 19 is designed for connection to a discharge line.

The control module 7 has a total of three shut-off members 21, 23, 25 which are each operatively connected to handling means, in this case rotary handles, which are arranged on the housing. The first shut-off member 21 serves for selectively closing and releasing a discharge duct arranged in the housing interior. The second shut-off member 23 serves for selectively closing or releasing a direct alarm duct. The third shut-off member 25 serves for selectively closing or releasing an alarm testing duct. The internal mode of operation and the individual ducts will be described in more detail in the following figures.

Figure 2:
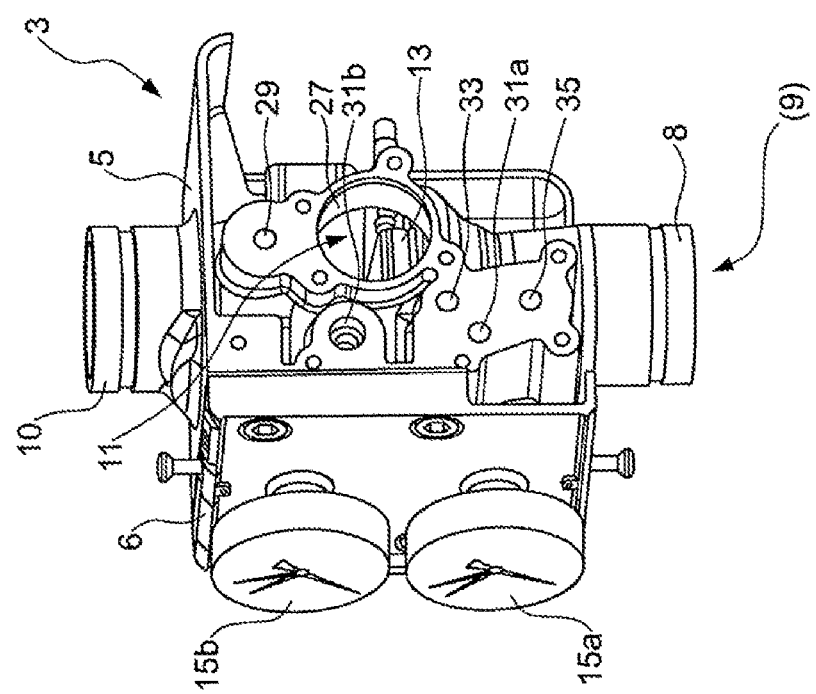
FIG. 2 shows a schematic three-dimensional view of a part of the fire extinguishing system valve as shown in FIG. 1.

FIG. 2 shows the housing basic body 5 with the housing 3 opened.

On the housing basic body 5 there are formed a first and second connection 27, 29 which are connected in a fluid-conducting manner to the fluid outlet chamber 11.

FIG. 2 also gives a free view of a closing body 13 which, in the blocking state shown, prevents the direct transfer of extinguishing agent from the fluid inlet chamber 9 into the fluid outlet chamber 11, and vice versa.

In the housing basic body 5 there are formed two bypass connections 31a, 31b, of which the first bypass connection 31a is in communication with the fluid inlet chamber 9 in a fluid-conducting manner, whereas the second bypass connection 31b is in communication with the fluid outlet chamber 11.

On the housing basic body 5 there is also formed an alarm duct connection 33 which leads into the fluid inlet chamber in such a way that, in the blocking state of the closing body 13, it is closed by the latter, and is released upon opening of the closing body 13 and is in communication with the fluid inlet chamber 9 in a fluid-conducting manner.

There is also formed on the housing basic body 5 a direct alarm connection 35 which is in communication with the fluid inlet chamber 9 in a fluid-conducting manner.

Figure 3:
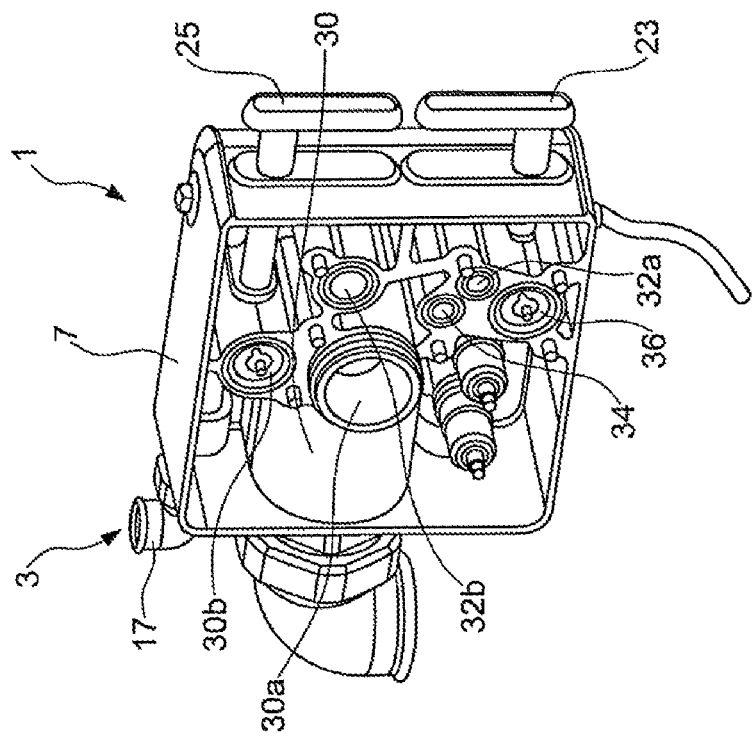
FIG. 3 shows a three-dimensional view of a further part of the fire extinguishing system valve as shown in FIG. 1.

FIG. 3 shows, in a complementary manner to FIG. 2, the second part of the housing 3, namely the control module 7. The control module 7 has a series of ducts which correspond to the connections shown and described above in FIG. 2.

The control module 7 has a discharge duct 30 which has a first inlet 30a and a second inlet 30b. The first inlet 30a of the discharge duct 30 is adapted for connection to the first connection 27 of the housing basic body 5, whereas the second inlet 30b is adapted for connection to the second connection 29 of the housing basic body 5.

The control module 7 also has a bypass inlet 32a and a bypass outlet 32b, wherein the bypass inlet 32a is adapted for connection to the first bypass connection 31a in the housing basic body 5, and the bypass outlet 32b is adapted for connection to the second bypass connection 31b in the housing basic body 5.

The control module 7 also has an alarm duct inlet 34 which is adapted for connection to the alarm duct connection 33 in the housing basic body 5. Furthermore, the control module 7 has a direct alarm duct inlet 36 which is adapted for connection to the direct alarm connection 35 in the housing basic body 5.

Figure 4:
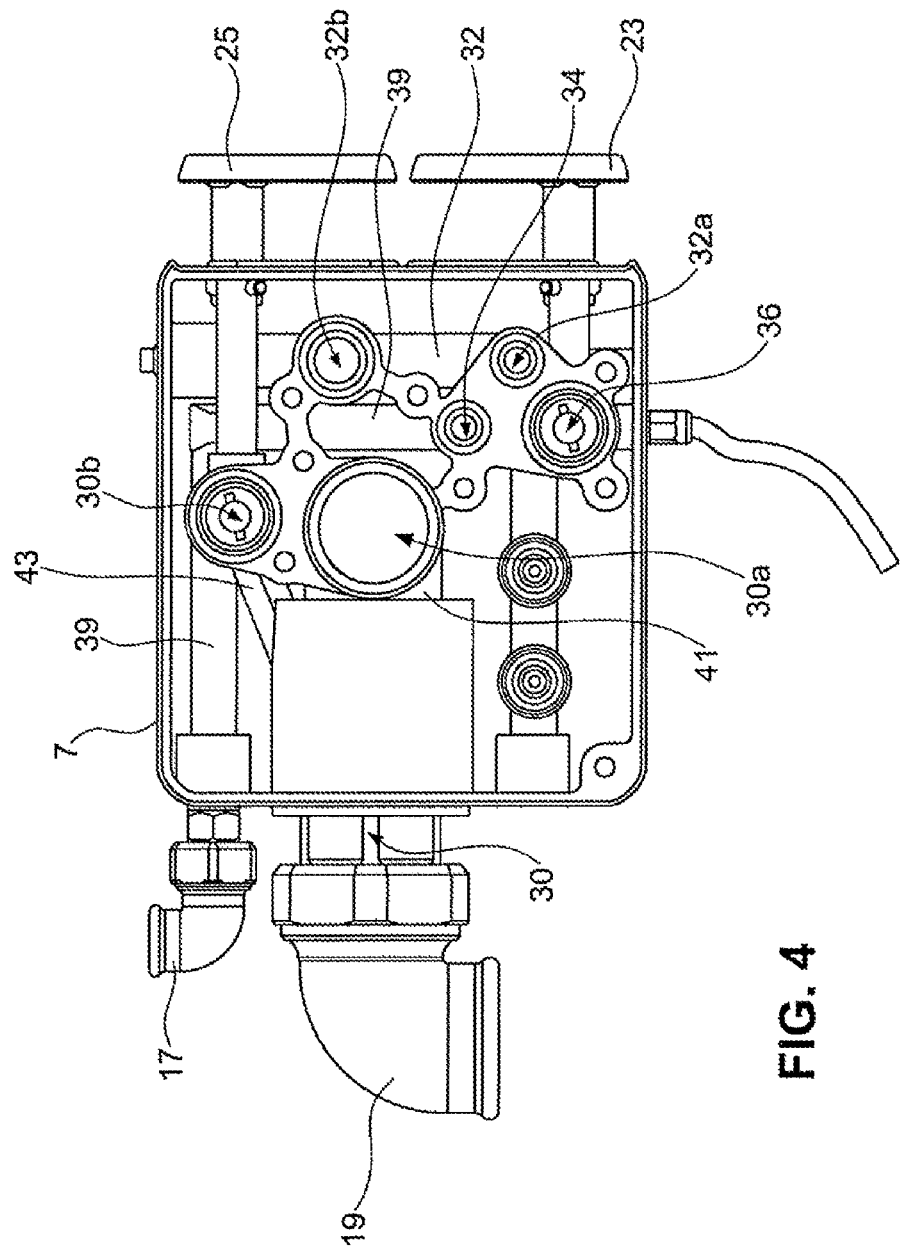
FIG. 4 shows a side projection of the part from FIG. 3.
Figure 5:
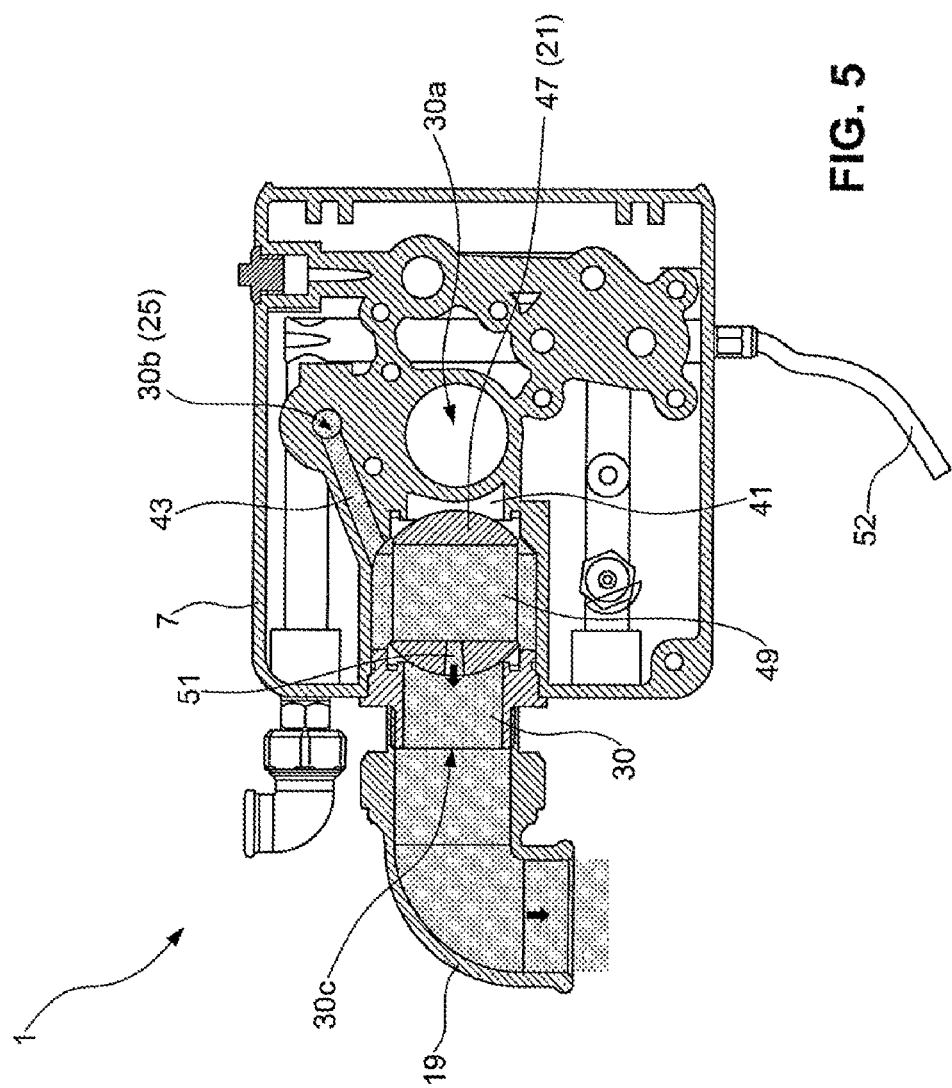
FIG. 5 shows a further side view of the part as shown in FIGS. 3 and 4 in a sectional illustration.

The course of the individual ducts in the interior of the control module is illustrated in FIGS. 4 and 5. Adjoining 31b, an inner backflow preventer is preferably reversibly integrated in the housing. As a result, a backflow from the fluid outlet chamber 11 to the fluid inlet chamber 9 is prevented. The bypass inlet 32a and the bypass outlet 32b are connected in a fluid-conducting manner by means of a bypass duct 32 in the interior of the control module.

The alarm duct inlet 34 and the direct alarm duct inlet 36 each open into an alarm duct 39 which is arranged in the interior of the control module and which is led toward the connection piece 17 out of the housing. The fluid-conducting connection between the alarm duct 39 and the direct alarm duct inlet 36 can be selectively disconnected or released by means of the shut-off member 23.

The first discharge duct inlet 30a opens into a first branch line 41 of the discharge duct 30, whereas the second discharge duct inlet 30b opens into a second branch line 43 which for its part opens into the discharge duct 30. The discharge duct 30 is led toward the connection piece 19 out of the housing.

The second discharge duct inlet 30b can be selectively released or blocked by means of the shut-off member 21.

The realization of the discharge function and of the alarm testing function will be explained in more detail with reference to FIG. 5. A hose 52 is mounted on the housing basic body 5 for the discharge of liquid from the alarm duct 39.

The shut-off member 21 (FIG. 1) is operatively connected to a ball element 47. In the position shown in FIG. 5, the ball element 47 is switched into an alarm testing position. In the position shown, the fluid-conducting connection between the first discharge duct inlet 30a and an outlet 30c of the discharge duct 30 is interrupted, whereas extinguishing agent can flow through the second discharge duct inlet 30b and the second branch line 43 into the discharge duct 30.

The shut-off member 21 has, in the ball element 47, a first passage 49 with a first cross section and a second passage 51 with a second, smaller cross section. The first passage 49 extends completely through the ball element 47, whereas the second passage 51 opens into the first passage 49. The flow resistance achieved by the cross-sectional reduction in the second passage 51 and/or the second branch line 43 preferably results in a K-factor in the region of $K \leq 85$, preferably $K \leq 57$, and therefore, with the shut-off member 25 being switched into the alarm testing position, the activation of a sprinkler 103 (FIG. 6) is simulated.

If the shut-off member 21 is switched into its discharge position, the ball 47 assumes a position in which it is rotated by 90° by comparison with the state shown in FIG. 5, in which position the first passage 49 is oriented in alignment with the first branch line 41 of the discharge duct 30. Extinguishing agent can then flow through the first passage with full cross section and pass through the outlet 30c of the discharge duct 30 toward the connection piece 19, it being the case that a considerably greater volumetric flow is achieved than in the alarm testing position.

If, proceeding therefrom, the shut-off member 21 is rotated by a further 90° such that the ball 47 assumes a position in which it is rotated by 180° relative to the state shown in FIG. 5, the discharge duct 30 is closed fluid-tight on the outlet side such that no extinguishing agent can flow toward the outlet 30c. There does indeed remain a fluid-conducting connection between the first and second branch line 41, 43 and thus between the two discharge duct inlets 30a, b. However, since they are both in communication with the fluid outlet chamber in a fluid-conducting manner, there is no fear of fluid exiting the fire extinguishing system valve 1 in an undesired manner even for the case that the shut-off member 25 is switched into the blocking position.

Figure 6:
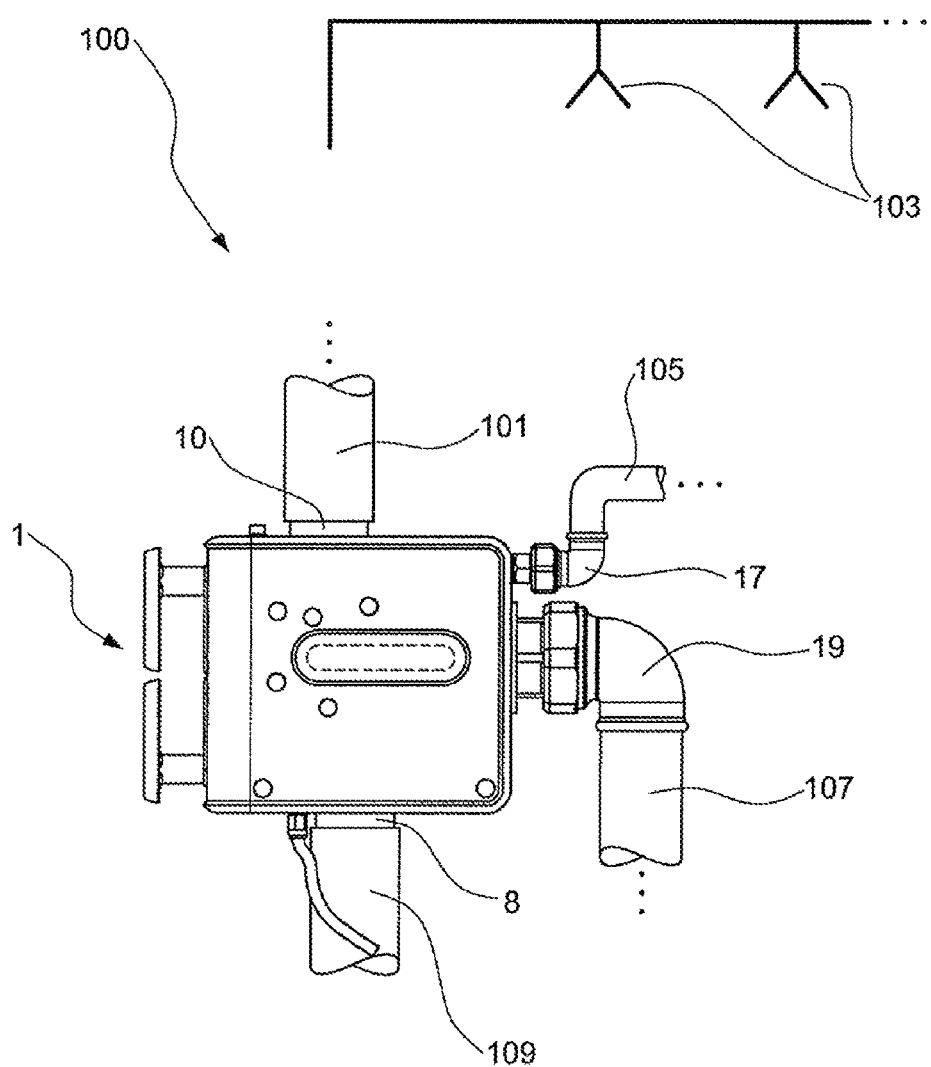
FIG. 6 shows a schematic illustration of a fire extinguishing system according to the invention in a preferred embodiment.

Finally, FIG. 6 schematically shows the installation of the fire extinguishing system valve 1 according to the invention into a fire extinguishing system 100. The fire extinguishing system 100 has an extinguishing agent supply 109 which is connected in a fluid-conducting manner to the fire extinguishing system valve 1 by means of the connection piece 8. On the outlet side, the fire extinguishing system 100 has one or more pipelines 101 which are connected to the fire extinguishing system valve 1 by means of the connection piece 10.

A discharge line 107 or a collection container is preferably connected to the fire extinguishing system valve 1 via the discharge connection piece 19. An alarm line 105 is preferably connected to the fire extinguishing system valve 1 via the alarm duct connection piece 17.

The pipeline 101 leads to one or more sprinklers 103 which are designed to register temperature increases in regions monitored by them and to trigger when predetermined temperatures are exceeded.

The closing body 13 of the fire extinguishing system valve 1 is moved from its transverse position (FIG. 2) into a release position as soon as a predetermined pressure value in the pipeline 101 is fallen below on account of the extinguishing agent flowing out of the sprinklers 103. Opening the closing body 13 also allows extinguishing agent to float through the alarm duct 39 in the interior of the fire extinguishing system valve toward the alarm line 105, with the result that a corresponding alarm occurs.

LIST OF UTILIZED REFERENCE NUMBERS

1 Fire extinguishing system valve
3 Housing
5 Housing basic body
6 Front panel
7 Control module
8 Connection piece (inlet side)
9 Fluid inlet chamber
10 Connection piece (outlet side)

11 Fluid outlet chamber
13 Closing body
15a, b Manometer
17 Connection piece (alarm line)
19 Connection piece (discharge line)
21 Shut-off member (discharge duct)
23 Shut-off member (direct alarm duct)
25 Shut-off member (alarm testing duct)
27 First connection (fluid outlet chamber)
29 Second connection (fluid outlet chamber)
30 Discharge duct
30a First inlet (discharge duct)
30b Second inlet (discharge duct)
30c Outlet (discharge duct)
31a Bypass connection (fluid inlet chamber)
31b Bypass connection (fluid outlet chamber)
32 Bypass duct
32a Bypass inlet
32b Bypass outlet
33 Alarm duct connection
34 Alarm duct inlet
35 Direct alarm connection
36 Direct alarm duct inlet
39 Alarm duct
41 First branch line (discharge duct)
43 Second branch line (discharge duct)
47 Ball element (shut-off member)
49 First passage
51 Second passage
52 Hose
100 Fire extinguishing system
101 Pipeline
103 Sprinkler
105 Alarm line
107 Discharge line
109 Extinguishing agent supply

The invention claimed is:

1. A fire extinguishing system valve, comprising
a housing which has a fluid inlet chamber, a fluid outlet chamber and a closing body which can move back and forth between a blocking state and a release state,
wherein the fluid inlet chamber and the fluid outlet chamber communicate directly with one another in a fluid-conducting manner in the release state, and the closing body prevents direct communication between the fluid inlet chamber and the fluid outlet chamber in the blocking state,
wherein the housing has a dedicated discharge duct which has at least one inlet connected to the fluid outlet chamber and an outlet leading out of the housing of the fire extinguishing system valve, and which is integrated into the housing, and the fire extinguishing system valve is designed to selectively release the dedicated discharge duct in a discharge position in the direction of its outlet or, in a blocking position, to close it fluid-tight in the direction of its outlet, and, in an alarm testing position, to remove extinguishing agent from the fluid outlet chamber via a duct portion having a duct portion cross section which is smaller than a smallest cross section of the dedicated discharge duct;
wherein a shut-off member is arranged in the dedicated discharge duct and can be selectively switched into the blocking position or the discharge position,
wherein the shut-off member can additionally be switched into the alarm testing position in which the discharge duct is released in the direction of its outlet with a cross section reduced relative to the discharge position,
wherein, as viewed from the shut-off member, the discharge duct has, on an inlet side, a first and a second branch duct which are each connected in a fluid-conducting manner to the fluid outlet chamber,
wherein at least the first branch duct and the outlet of the discharge duct communicate with one another in a fluid-conducting manner in the discharge position of the shut-off member, and
wherein the second branch duct exclusively communicates in a fluid-conducting manner with the outlet of the discharge duct in the alarm testing position of the shut-off member, and neither the first nor the second branch duct communicates with the outlet of the discharge duct in the blocking position of the shut-off member.

2. The fire extinguishing system valve as recited in claim 1, wherein the closing body moves back and forth between a blocking state and a release state based on a pressure difference between the fluid inlet chamber and the fluid outlet chamber.

3. The fire extinguishing system valve as claimed in claim 2,
wherein the housing has a housing basic body in which the fluid inlet chamber and the fluid outlet chamber are formed and the closing body is arranged, and further has a control module which is reversibly releasably connected to the housing basic body, wherein the dedicated discharge duct is formed in the control module.

4. The fire extinguishing system valve as claimed in claim 1, wherein the cross section reduced relative to the discharge position comprises a cross-sectional reduction formed in the discharge duct and/or in the shut-off member.

5. The fire extinguishing system valve as claimed in claim 3,
wherein the second branch duct is formed in the control module, and has a shut-off member for selectively blocking or releasing the second branch duct.

6. The fire extinguishing system valve as claimed in claim 4,
wherein the cross-sectional reduction is dimensioned in such a way that a flow resistance produced by the cross-sectional reduction at least approximates to that of a sprinkler or spray water valve assigned to the fire extinguishing system valve.

7. The fire extinguishing system valve as claimed in claim 3,
wherein a bypass duct is formed in the control module, and connects the fluid inlet chamber and the fluid outlet chamber to one another in a fluid-conducting manner, wherein a shut-off member for selectively blocking or releasing the bypass duct is provided in the bypass duct.

8. The fire extinguishing system valve as claimed in claim 3,
wherein a direct alarm duct is provided in the control module, and, on the inlet side, is connected directly in a fluid-conducting manner to the fluid inlet chamber and has an outlet which leads out of the control module, and which is designed for connection to an external alarm line having an alarm bell line,
wherein a shut-off member is arranged in the direct alarm duct and can be selectively switched into a blocking position or a release position.

9. The fire extinguishing system valve as claimed in claim 3,
wherein an alarm duct is arranged in the housing basic body and/or the control module, wherein the alarm duct is arranged in such a way that it is also blocked in the blocking state of the closing body, and is flooded with the closing body opened, wherein the alarm duct extends through the control module, and has an outlet which leads out of the control module, and is designed for connection to an external alarm line having an alarm bell line.

10. A control module for a fire extinguishing system valve as claimed in claim 1, comprising
- fastening means for reversibly releasable connection to corresponding fastening means of a housing basic body of the fire extinguishing system valve, and
- the dedicated discharge duct which has the at least one inlet and the outlet, and is integrated into the control module, wherein
- the at least one inlet and the outlet are arranged in such a way that, with the housing basic body connected to the control module, the at least one inlet is connected to a fluid outlet chamber of the fire extinguishing system valve, and which is designed to selectively release the dedicated discharge duct in the discharge position in the direction of its outlet or, in the blocking position, to close it fluid-tight in the direction of its outlet, and, in the alarm testing position, to remove extinguishing fluid from the fluid outlet chamber via the duct portion having a cross section which is smaller than a smallest cross section of the dedicated discharge duct.

11. A fire extinguishing system comprising one or more fluid lines in which a fire extinguishing system valve for blocking and releasing the fluid lines is arranged, wherein the fire extinguishing system valve is designed as claimed in claim 1.

12. The fire extinguishing system valve as claimed in claim 1,
- wherein the shut-off member comprises a ball-shaped valve body including a first passage which extends completely through the valve body, and a second passage which is oriented at an angle to the first passage, and opens into the first passage.

* * * * *